(12) United States Patent
Kamaeguchi et al.

(10) Patent No.: US 6,271,832 B1
(45) Date of Patent: Aug. 7, 2001

(54) WIRELESS INPUT APPARATUS (75) Inventors: Shinji Kamaeguchi, Kadoma; Hiroaki Nishiono, Osaka; Takefumi Inoue, Katano, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/999,658

(22) Filed: Dec. 30, 1997

(30) Foreign Application Priority Data

Jan. 7, 1997 (JP) ..................................................... 9-000503

(51) Int. Cl.[7] ......................................................... G09G 5/08
(52) U.S. Cl. ............................. 345/158; 345/169; 341/26; 348/734
(58) Field of Search ..................................... 345/158, 179, 345/157, 180, 169, 165; 340/825.72, 825.06; 250/231.1; 395/567, 200.31; 370/413; 341/26; 348/734

(56) References Cited

U.S. PATENT DOCUMENTS

| | | | |
|---|---|---|---|
| 4,514,732 | * | 4/1985 | Hayes, Jr. ........................ 345/825.57 |
| 5,166,668 | | 11/1992 | Aoyagi . |
| 5,227,622 | | 7/1993 | Suzuki . |
| 5,296,838 | | 3/1994 | Suzuki . |
| 5,321,229 | * | 6/1994 | Holling et al. ...................... 219/445.1 |
| 5,469,152 | * | 11/1995 | Yamamoto et al. ............. 340/825.63 |
| 5,554,980 | * | 9/1996 | Hashimoto et al. ............. 340/825.72 |
| 5,585,619 | | 12/1996 | Goto et al. . |
| 5,608,655 | | 3/1997 | Moughanni et al. . |
| 5,635,959 | * | 6/1997 | Takeuchi et al. ...................... 345/179 |
| 5,684,471 | * | 11/1997 | Bernardi et al. ................. 340/825.72 |
| 5,724,106 | * | 3/1998 | Autry et al. .......................... 348/734 |
| 5,731,763 | * | 3/1998 | Herweck et al. ................ 340/825.69 |

* cited by examiner

Primary Examiner—Steven Saras
Assistant Examiner—Fritz Alphonse
(74) Attorney, Agent, or Firm—Michael K. Kelly; Snell & Wilmer L.L.P.

(57) ABSTRACT

A wireless input apparatus includes a transmitting section responsive to turning-on of a switch for transmitting a prescribed signal, and a transmission control section for measuring a time period during which an on state of the switch continues, and inhibiting the transmission by the transmitting section when the measured time period becomes equal to a prescribed time period.

7 Claims, 10 Drawing Sheets

WIRELESS INPUT APPARATUS

BACKGROUND OF THE INVENTION

1. Field of the Invention

The present invention relates to a wireless input apparatus for use in information processing equipments such as personal computers, word processors and home game apparatuses.

2. Description of the Related Art

Figure 9:
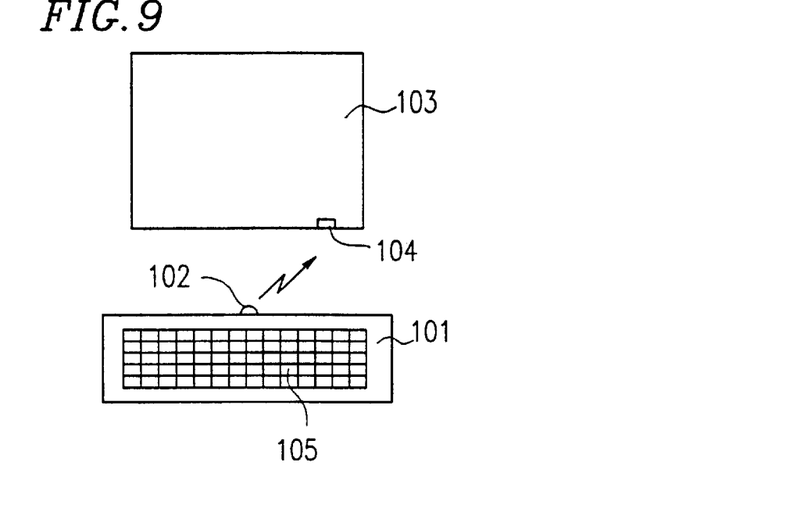
FIG. 9 is a diagram schematically showing an external appearance of a conventional wireless input apparatus and an information processing apparatus.

A conventional wireless input apparatus of this type is an input apparatus which transmits a signal to information processing equipments such as personal computers, word processors and home game apparatuses. For example, as shown in FIG. 9, a wireless input apparatus 101 is a keyboard having a light emitting diode 102. Each time any one of keys 105 of the keyboard is pressed, the wireless input apparatus 101 causes the light emitting diode 102 to emit light, thereby transmitting an optical signal corresponding to the pressed key. An information processing equipment 103 receives the optical signal transmitted from the light emitting diode 102 at a light receiving element 104, and determines which key of the keyboard was pressed based on an electric output of the light receiving element 104.

Figure 10:
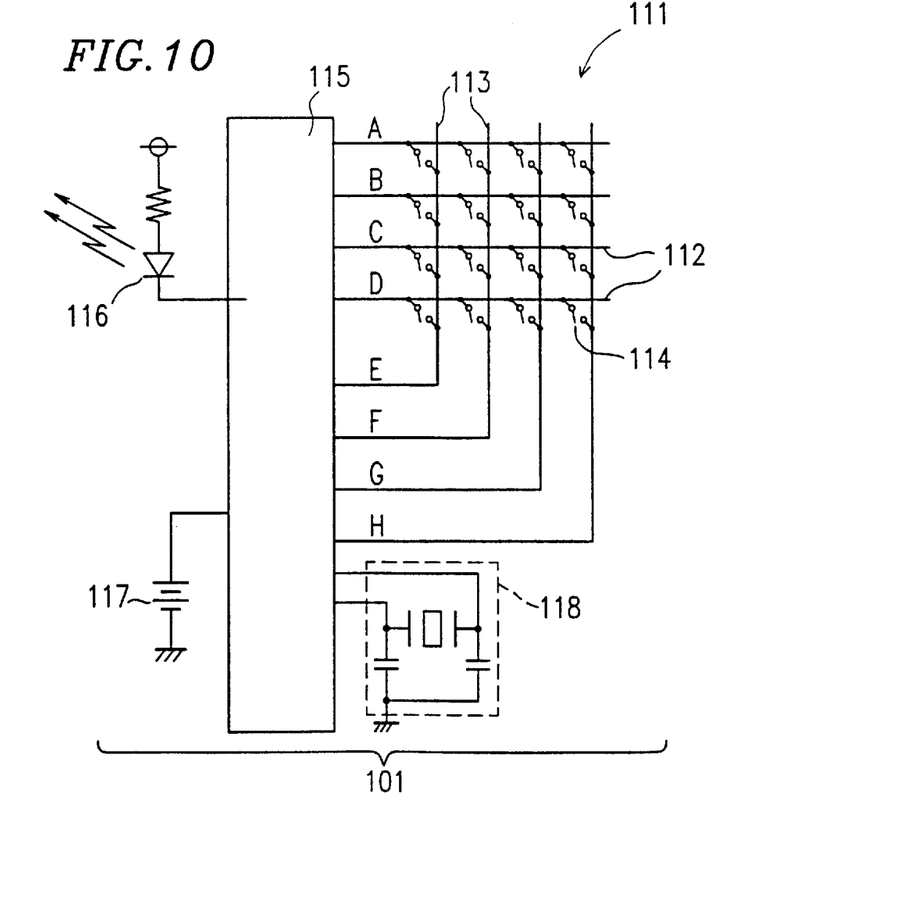
FIG. 10 is a block diagram showing a conventional wireless input apparatus.

FIG. 10 is a block diagram schematically showing a structure of the wireless input apparatus 101. In FIG. 10, a switch matrix 111 is structured such that a plurality of scanning lines 112 and a plurality of receiving lines 113 intersect each other with a key switch 114 interposed between scanning line 112 and receiving line 113 at each of the intersections of the scanning lines 112 and the receiving lines 113. The key switches 114 at the intersections correspond to the respective keys in the keyboard. Accordingly, when any one of the keys is pressed, a key switch 114 corresponding to the pressed key is turned on, and a corresponding pair of scanning line 112 and receiving line 113 are electrically connected to each other through the key switch 114.

A microcomputer 115 sequentially scans the scanning lines 112. Accordingly, when any one of the key switches 114 is turned on and a corresponding pair of scanning line 112 and receiving line 113 are electrically connected to each other through the key switch 114, the microcomputer 115 identifies the key switch 114 based on a potential at the receiving line 113.

The microcomputer 115 applies an identification signal indicating the turning-on of the identified key switch 114 to an infrared light emitting diode 116, which in turn converts the identification signal from an electric signal to an optical signal for transmission.

When the identified key switch 114 is turned off thereafter, the corresponding scanning line 112 and the corresponding receiving line 113 are electrically disconnected from each other. Therefore, the receiving line 113 is rendered at high impedance, and the potential at the receiving line 113 is changed. The microcomputer 115 detects the turning-off of the identified key switch 114 at the time of scanning the corresponding scanning line 112 which had been electrically connected to the corresponding receiving line 113. Then, the microcomputer 115 applies an identification signal indicating the turning-off of the identified key switch 114 to the infrared light emitting diode 116, which in turn converts the identification signal from an electric signal to an optical signal for transmission.

A battery is used as a power supply 117. A voltage of the power supply 117 is supplied to the microcomputer 115 and an oscillator 118.

In the wireless input apparatus 101, in the case where the switch matrix 111 has not been operated for a prescribed period of time, oscillation of the oscillator 118 is stopped, whereby the operation of the microcomputer 115 is stopped. Thus, power consumption is reduced and the life of the power supply 117 is lengthened.

When any of the key switches 114 in the switch matrix 111 is turned on after oscillation of the oscillator 118 is stopped, oscillation of the oscillator 118 is resumed, whereby the microcomputer 115 is caused to start operating again.

Such a function to temporarily stop the oscillation of the oscillator 118 so as to lengthen the life of the power supply 117 is referred to as a key wake-up function. In other words, according to the key wake-up function, when software which carries out required procedures is executed, and therefore the switch matrix 111 has not been operated for a prescribed period of time, oscillation of the oscillator 118 for causing the microcomputer 115 to operate is stopped. When any one of the key switches 114 in the switch matrix 111 is turned on after the oscillation of the oscillator 118 is stopped, a prescribed signal is generated. In response to the signal, the oscillator 118 starts oscillating again, whereby the operation of the microprocessor 115 is resumed.

Figure 11A:
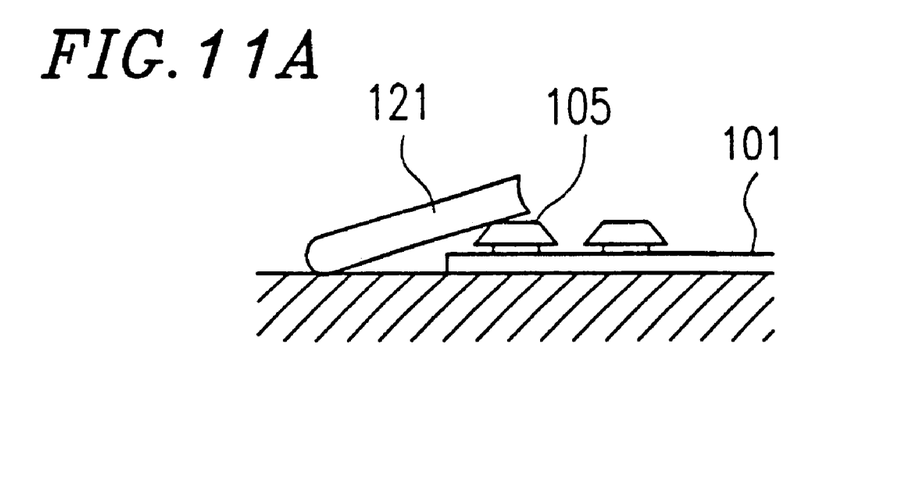
FIG. 11A illustrate a state in which a wireless input apparatus is used.
Figure 11B:
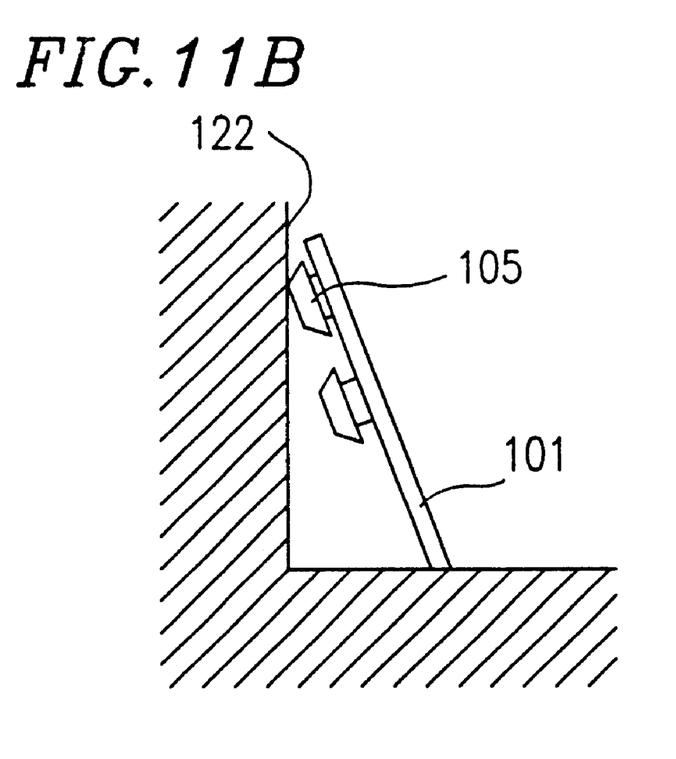
FIG. 11B illustrate another state in which a wireless input apparatus is used.

In the above-mentioned conventional wireless input apparatus, when the switch matrix 111 has not been operated for a prescribed period of time, the microcomputer 115 is stopped by the key wake-up function. Therefore, power consumption is minimized. However, when a book 121, for example, is placed on the wireless input apparatus 101 as shown in FIG. 11A or when the wireless input apparatus 101 is leaned against, for example, a wall 122, as shown in FIG. 11B, the key switches 114 in the switch matrix 111 might be turned on by accident. When any one of the key switches 114 is turned on, the microcomputer 115 is caused to operate by the key wake-up function. Moreover, the infrared light emitting diode 116 emits light in response to the turning-on of the key switch 114. In such a case as shown in FIGS. 11A and 11B, this condition could last for a long time. As a result, the power supply 117 is wasted, whereby the life of the power supply 117 is reduced.

SUMMARY OF THE INVENTION

A wireless input apparatus of the present invention includes a transmitting section responsive to turning-on of a switch for transmitting a prescribed signal; and a transmission control section for measuring a time period during which an on state of the switch continues, and inhibiting the transmission by the transmitting section when the measured time period becomes equal to a prescribed time period.

A wireless input apparatus of the present invention includes a transmitting section responsive to turning-on of a switch for transmitting a prescribed signal; a storing section for measuring a time period during which an on state of the switch continues, and storing inhibition data of the transmission conducted in response to turning-on of the switch when the measured time period becomes equal to a prescribed first time period; and a transmission control section for inhibiting transmission by the transmitting section when the inhibition data of the transmission conducted in response to turning-on of the switch is stored in the storing section.

In one embodiment, a wireless input apparatus further includes a plurality of switches, wherein the transmitting section transmits a signal corresponding to a turned-on switch in response to every turning-on of a switch; the storing section measures, switch by switch, a time period during which an on state of the switch continues, and stores inhibition data of the transmission conducted in response to turning-on of the switch when the measured time period becomes equal to a prescribed first time period; and the transmission control section inhibits, switch by switch, transmission conducted by the transmitting section in response to turning-on of the switch, when the inhibition data of the transmission in response to turning-on of the switch is stored.

In one embodiment, a wireless input apparatus, wherein the transmission control section measures a time period during which an off state of a switch continues when the inhibition data of the transmission conducted by the transmitting section in response to the turning-on of the switch is not stored in the storing section, inhibits transmission by the transmitting section when the measured time period becomes equal to a prescribed second time period, and resumes transmission by the transmitting section in response to subsequent turning-on of a switch.

A wireless input apparatus includes a transmitting section responsive to turning-on of a switch for transmitting a prescribed signal; a storing section for measuring a time period during which an on state of the switch continues, and storing invalidation data of the turning-on of the switch when the measured time period becomes equal to a prescribed first time period; and a transmission control section for making the turning-on of the switch invalid when the invalidation data of the turning-on of the switch is stored in the storing section.

In one embodiment, a wireless input apparatus further includes a plurality of switches, wherein the transmitting section transmits a signal corresponding to a turned-on switch in response to every turning-on of a switch; the storing section measures, switch by switch, a time period during which an on state of the switch continues, and stores invalidation data of the turning-on of the switch when the measured time period becomes equal to a prescribed first time period; and the transmission control section makes, switch by switch, the turning-on of the switch invalid when the invalidation data of the turning-on of the switch is stored in the storing section.

In one embodiment, a wireless input apparatus, wherein the transmission control section measures a time period during which an off state of a switch continues when the invalidation data of the turning-on of the switch is not stored in the storing section, inhibits transmission by the transmitting section when the measured time period becomes equal to a prescribed second time period, and resumes transmission by the transmitting section in response to subsequent turning-on of a switch.

Thus, the invention described herein makes possible the advantage of providing a wireless input apparatus capable of stopping operation when a switch in a switch matrix is turned on by accident and is not turned off for a prescribed period of time, thereby suppressing power consumption.

This and other advantages of the present invention will become apparent to those skilled in the art upon reading and understanding the following detailed description with reference to the accompanying figures.

DESCRIPTION OF THE PREFERRED EMBODIMENTS

Hereinafter, examples of the present invention will be described in detail with reference to the accompanying drawings.

EXAMPLE 1

Figure 1:
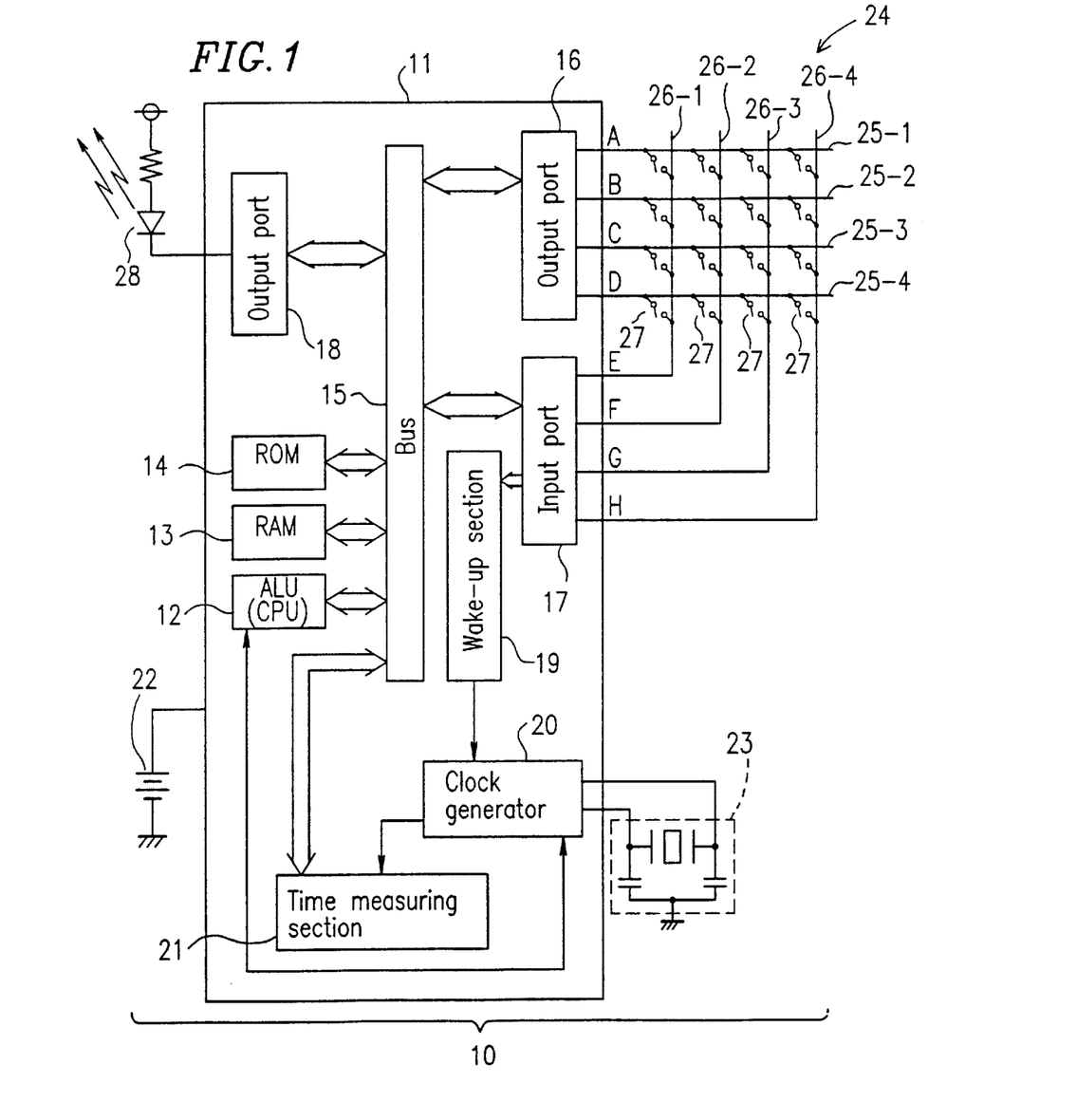
FIG. 1 is a block diagram showing a wireless input apparatus according to a first example of the present invention.

FIG. 1 is a block diagram showing a wireless input apparatus according to a first example of the present invention. In the wireless input apparatus 10, a microcomputer 11 includes a central processing unit (CPU) 12, a random access memory (RAM) 13, a read only memory (ROM) 14, a data bus 15, an output port 16 for a switch (hereinafter, referred to as switch output port 16), an input port 17 for a switch (hereinafter, referred to as switch input port 17), an output port 18 for transmission (hereinafter, referred to as transmission output port 18), a wake-up section 19, a clock generator 20, and a time measuring section 21.

The microcomputer 11 receives a voltage from a power supply 22. An oscillator 23 receives a voltage from the power supply 22 through the clock generator 20, and generates an oscillation signal to supply the oscillation signal to the clock generator 20. The clock generator 20 forms a clock signal from the oscillation signal to supply the clock signal to the microcomputer 11, whereby the microcomputer 11 is caused to operate.

The CPU 12 reads a program or data from the ROM 14, and performs an operation using a storage region of the RAM 13, thereby generally controlling the microcomputer 11.

A switch matrix 24 is structured such that a plurality of scanning lines 25-1 through 25-4 and a plurality of receiving lines 26-1 through 26-4 intersect each other with a key switch 27 interposed between scanning line and receiving line at each of the intersections of the scanning lines 25-1 through 25-4 and the receiving lines 26-1 through 26-4. The key switches 27 at the intersections correspond to respective keys in a keyboard. Therefore, when any one of the keys is pressed, a key switch 27 corresponding the pressed key is turned on, and a corresponding pair of scanning line and receiving line are electrically connected to each other through the key switch 27.

In the microcomputer 11, the CPU 12 controls the switch output port 16 through the data bus 15 to sequentially scan the scanning lines 25-1 through 25-4. Each of the scanning lines 25-1 through 25-4 is set to high impedance, and falls to a low level upon each scan. It is assumed that any one of the key switches 27 is turned on and a corresponding pair of scanning line and receiving line are electrically connected to each other through that key switch 27. In this case, when the CPU 12 scans this corresponding scanning line, the corresponding receiving line falls to a low level. Thus, the CPU 12 is informed of the potential at this receiving line through the switch input port 17. Since the CPU 12 is informed of the potential at the receiving line at the time of scanning this scanning line, the CPU 12 can detect and identify the turned-on key switch 27.

The CPU 12 controls the switch output port 16 through the data bus 15, and applies an identification signal indicating the turning-on of the identified key switch 27 to an infrared light emitting diode 28. The infrared light emitting diode 28 in turn converts the identification signal from an electric signal to an optical signal for transmission.

When the identified key switch 27 is turned off thereafter, the corresponding scanning line and the corresponding receiving line are electrically disconnected from each other, and therefore, the potential at this receiving line is changed. As a result, the CPU 12 is informed of the changed potential at the receiving line through the switch input port 17 at the time of scanning this corresponding scanning line which had been electrically connected to the receiving line. Thus, the CPU 12 detects the turning-off of the identified key switch 27. Then, the CPU 12 applies an identification signal indicating the turning-off of the identified key switch 27 to the infrared light emitting diode 28. The infrared light emitting diode 28 in turn converts the identification signal from an electric signal to an optical signal for transmission.

Figure 2:
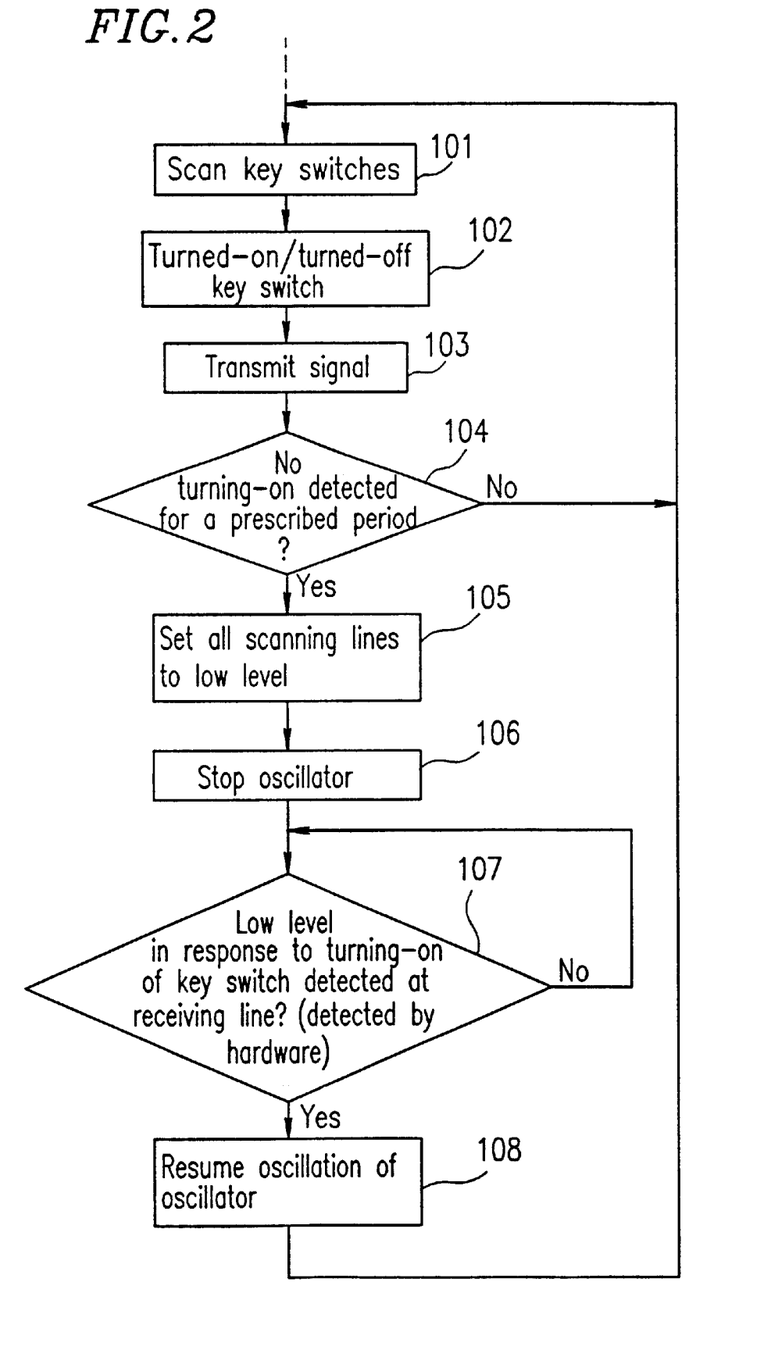
FIG. 2 is a flow chart illustrating a wake-up function in the wireless input apparatus of the first example.

The microcomputer 11 realizes a key wake-up function by performing the processing according to a flow chart shown in FIG. 2.

First, as described above, the CPU 12 sequentially scans the scanning lines 25-1 through 25-4, and detects turning-on and turning-off of each of the key switches 27 based on a potential at the corresponding receiving lines 26-1 through 26-4 (step 101). In the case where any one of the key switches 27 is turned on and the CPU 12 identifies the turned-on key switch 27, the CPU 12 transmits an identification signal indicating the turning-on of the identified key switch 27 from the infrared light emitting diode 28. Moreover, in the case where the identified key switch 27 is turned off, the CPU 12 transmits an identification signal indicating the turning-off of the key switch 27 from the infrared light emitting diode 28 (steps 102 and 103).

When none of the key switches 27 have yet been operated, the CPU 12 writes time measured by the time measuring section 21 to the RAM 13. Then, in a prescribed cycle, the CPU 12 obtains the difference between the time stored in the RAM 13 and current time measured by the time measuring section 21 as a time period during which the key switches 27 continue to be in an off state, that is, during which the key switches 27 are not operated (hereinafter, referred to as a continuous off period). Then, the CPU 12 determines whether or not the continuous off period becomes equal to a prescribed second time period (for example, 10 minutes) (step 104). If not (No in step 104), the program returns to the step 101. When the continuous off period becomes equal to the second time period (Yes in step 104), that is, when the continuous off period becomes equal to the second time period where none of the key switches 27 are being operated, the CPU 12 sets all of the scanning lines 25-1 through 25-4 to a low level (step 105), and blocks voltage supply to the oscillator 23, thereby stopping the oscillator 23 (step 106). Thus, the operation of the microcomputer 11 is stopped. As a result, power consumption is reduced.

However, the switch input port 17 and the wake-up section 19 in the microcomputer 11 are in an operating state.

The wake-up section 19 is constituted by a logic circuit. When every key switch 27 is off, the wake-up section 19 is in a stand-by state (No in step 107). When any one of the key switches 27 is turned on, a corresponding one of the receiving lines 26-1 through 26-4 is electrically connected to a corresponding one of the scanning lines 25-1 through 25-4. Thus, the receiving line electrically connected to the scanning line falls to a low level, and the potential at the receiving line is applied to the wake-up section 19 through the switch input port 17. The logic circuit of the wake-up section 19 responsively applies a signal to the clock generator 20, and the clock generator 20 in turn resumes supplying a voltage to the oscillator 23, thereby causing the oscillator 23 to operate (step 108). Then, the clock generator 20 forms a clock signal from an oscillation signal of the oscillator 23 to supply the clock signal to the microcomputer 11. Thus, the microcomputer 11 starts operating again, and the program returns to the step 101.

As described above, according to the key wake-up function, the microcomputer 11 is stopped when the keyboard has not been operated for the second time period, and starts operating again when the keyboard is operated thereafter. Thus, power consumption is reduced and the life of the power supply 22 is lengthened.

The operation of the microcomputer 11 is stopped by the key wake-up function. However, when a book, for example, is placed on the wireless input apparatus 10 or when the wireless input apparatus 10 is leaned against, for example, a wall, any of the key switches 27 in the switch matrix 24 might be turned on by accident. When any one of the key switches 27 is turned on, the microcomputer 11 starts operating again by the key wakeup function. Moreover, the infrared light emitting diode 28 emits light in response to the turning-on of the key switch 27. In such a case, this condition could last for a long time. As a result, the power supply 22 is wasted and power is consumed excessively.

Figure 3:
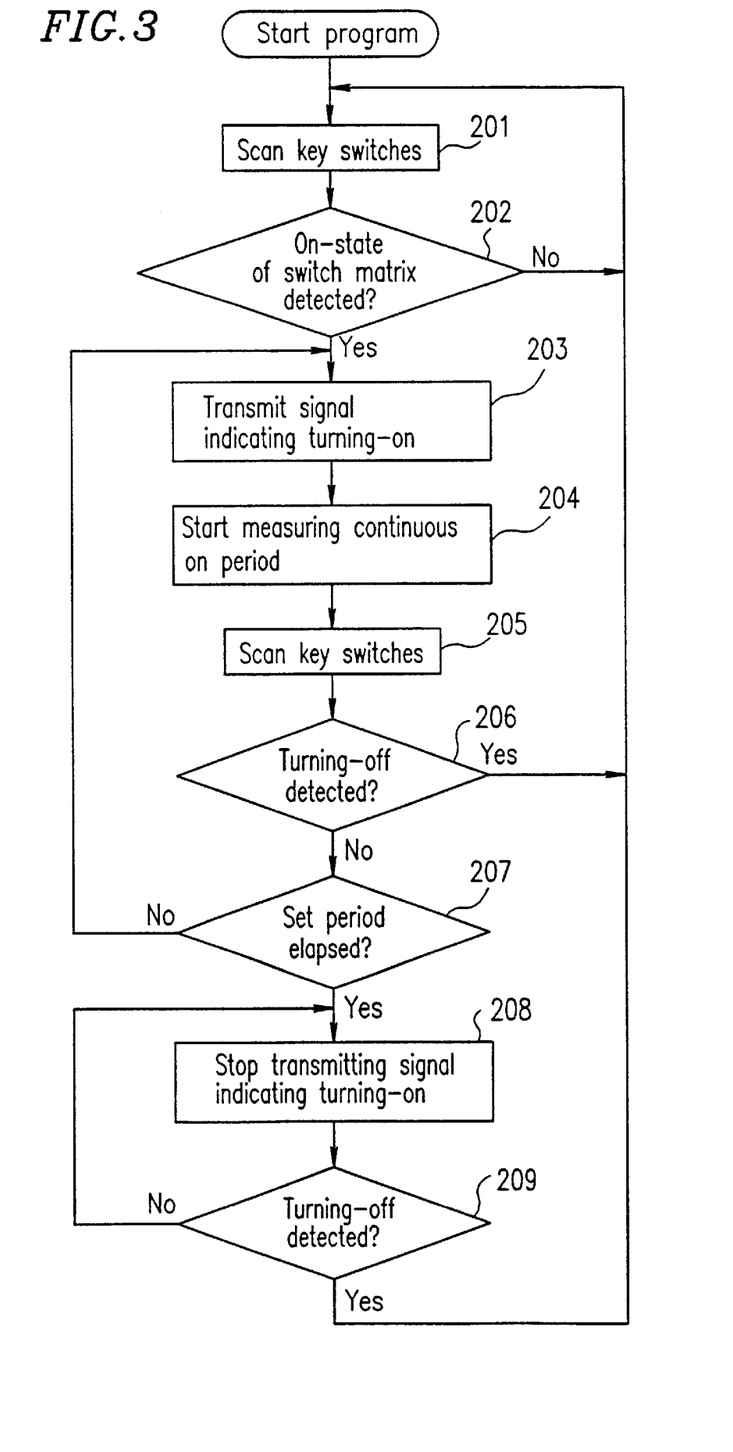
FIG. 3 is a flow chart illustrating a power saving function in the wireless input apparatus of the first example.

Then, in the present example, the processing according to a flow chart shown in FIG. 3 is conducted to prevent the above-mentioned condition from lasting for a long time.

First, the CPU 12 sequentially scans the scanning lines 25-1 through 25-4, and detects turning-on of each of the key switches 27 based on a potential at the corresponding receiving lines 26-1 through 26-4 (steps 201 and 202). In the case where one of the key switches 27 is turned on and the CPU 12 identifies the key switch 27 (Yes in step 202), the CPU 12 transmits an identification signal indicating the turning-on of the key switch 27 from the infrared light emitting diode 28 (step 203). Moreover, the CPU 12 writes time measured by the time measuring section 21 to the RAM 13 to start measuring a time period during which the identified key switch continues to be in an on state (hereinafter, referred to as a continuous on period) (step 204).

Then, the CPU 12 sequentially scans the scanning lines 25-1 through 25-4 to detect turning-off of the identified key switch 27 (steps 205 and 206). When this key switch 27 is turned off (Yes in step 206), the CPU 12 transmits an identification signal indicating the turning-off of the key switch 27 from the infrared light emitting diode 28. Moreover, the CPU 12 initializes the time stored in the RAM 13 to stop measuring the continuous on period. Then, the program returns to the step 201.

In the case where the identified key switch 27 is not turned off (No in step 206), the CPU 12 obtains, as a continuous on period of the identified key switch 27, the difference between the time stored in the RAM 13 and the current time measured by the time measuring section 21. Then, the CPU 12 compares the continuous on period with a prescribed first time period (for example, 10 minutes) to determine whether or not the continuous on period becomes equal to the first time period (step 207). If not (No in step 207), the CPU 12 continues to transmit the identification signal indicating turning-on of the key switch 27 (step 203) and also continues to measure the continuous on period (step 204). In the case where the key switch 27 further continues to be in an on state (No in step 206), the CPU 12 determines whether or not the continuous on period becomes equal to the first time period (step 207). If not (No in step 207), the program returns to the step 203, repeating the same processing.

In the case where the CPU 12 still does not detect turning-off of the identified key switch 27, the CPU 12 further continues to measure the continuous on period. When the continuous on period becomes equal to the first time period (Yes in step 207), the CPU 12 stops transmitting the identification signal indicating turning-on of the key switch 27 (step 208). Thereafter, the CPU 12 will not transmit the identification signal indicating turning-on of the key switch 27 (step 208) until this key switch 27 is turned off (No in step 209). Then, when the key switch 27 is turned off (Yes in step 209), the program returns to the step 201.

As described above, once any one of the key switches 27 is turned on, the CPU 12 starts measuring a continuous on period of the key switch 27 and will not stop measuring the continuous on period until the key switch is turned off. In addition, when the continuous on period becomes equal to the first time period, the CPU 12 stops transmitting the identification signal indicating the turning-on of the key switch 27. Accordingly, power consumption can be reduced as well as the life of the power supply 22 can be lengthened.

Note that the processing shown on the flow chart of FIG. 2 is partially the same as that shown on the flow chart shown in FIG. 3.

EXAMPLE 2

A wireless input apparatus according to a second example will now be described. The wireless input apparatus 10 of the second example is similar in structure to that shown in FIG. 1. The wireless input apparatus 10 of the second example is different from that shown in FIG. 1 in that the wireless input apparatus 10 of the second example includes a key state storage region 31 shown in FIG. 4 in a RAM 13 of a microcomputer 11, and performs the processing shown on the flow chart of FIG. 5.

Figure 4:
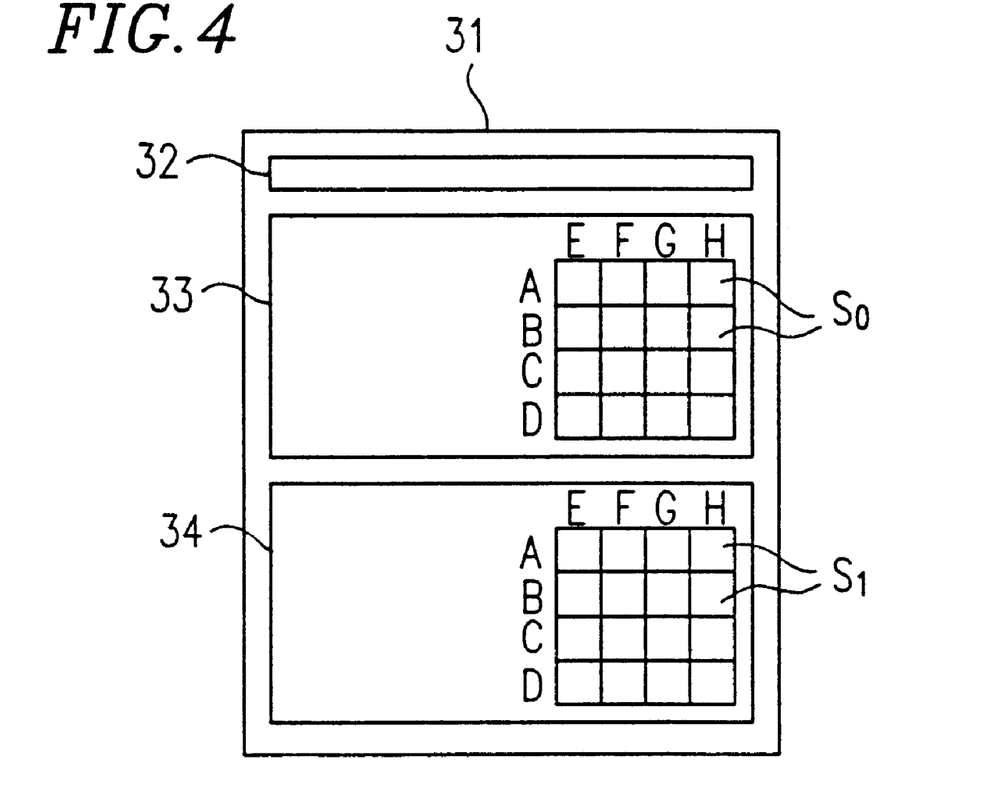
FIG. 4 is a diagram showing a structure of a key state storage region in a wireless input apparatus according to a second example of the present invention.

The key state storage region 31 shown in FIG. 4 includes a first time period storage region 32, an on/off storage table 33, and a key switch allowance/inhibition data storage table 34.

The first time period storage region 32 is provided to measure a continuous on period of a key switch 27. A CPU 12 writes time measured by a time measuring section 21 to the first time period storage region 32. Then, in a prescribed cycle, the CPU 12 obtains, as a continuous on period, the difference between the time stored in the first time period storage region 32 and current time measured by the time measuring section 21.

The on/off storage table 33 includes columns A, B, C and D corresponding to respective scanning lines 25-1 through 25-4 and rows E, F, G and H corresponding to respective receiving lines 26-1 through 26-4. Storage regions S0 at intersections of the rows and the columns correspond to respective key switches 27 in a switch matrix 24. When any one of the key switches 27 is turned on, the CPU 12 stores "on" in a storage region S0 corresponding to this key switch 27. When this key switch 27 is turned off, the CPU 12 stores "off" in the same storage region S0.

Similarly, the key switch allowance/inhibition data storage table 34 also includes columns A, B, C and D corresponding to respective scanning lines 25-1 through 25-4 and rows E, F, G and H corresponding to respective receiving lines 26-1 through 26-4. Storage regions S1 at intersections of the rows and the columns correspond to respective key switches 27 in the switch matrix 24. When the CPU 12 allows transmission of an identification signal indicating turning-on of any one of the key switches 27, the CPU 12 stores "allowance data" in a storage region S1 corresponding to this key switch 27. When the CPU 12 inhibits transmission of this identification signal indicating turning-on of the key switch 27, the CPU 12 stores "inhibition data" in the storage region S1 corresponding to this key switch 27.

Figure 5:
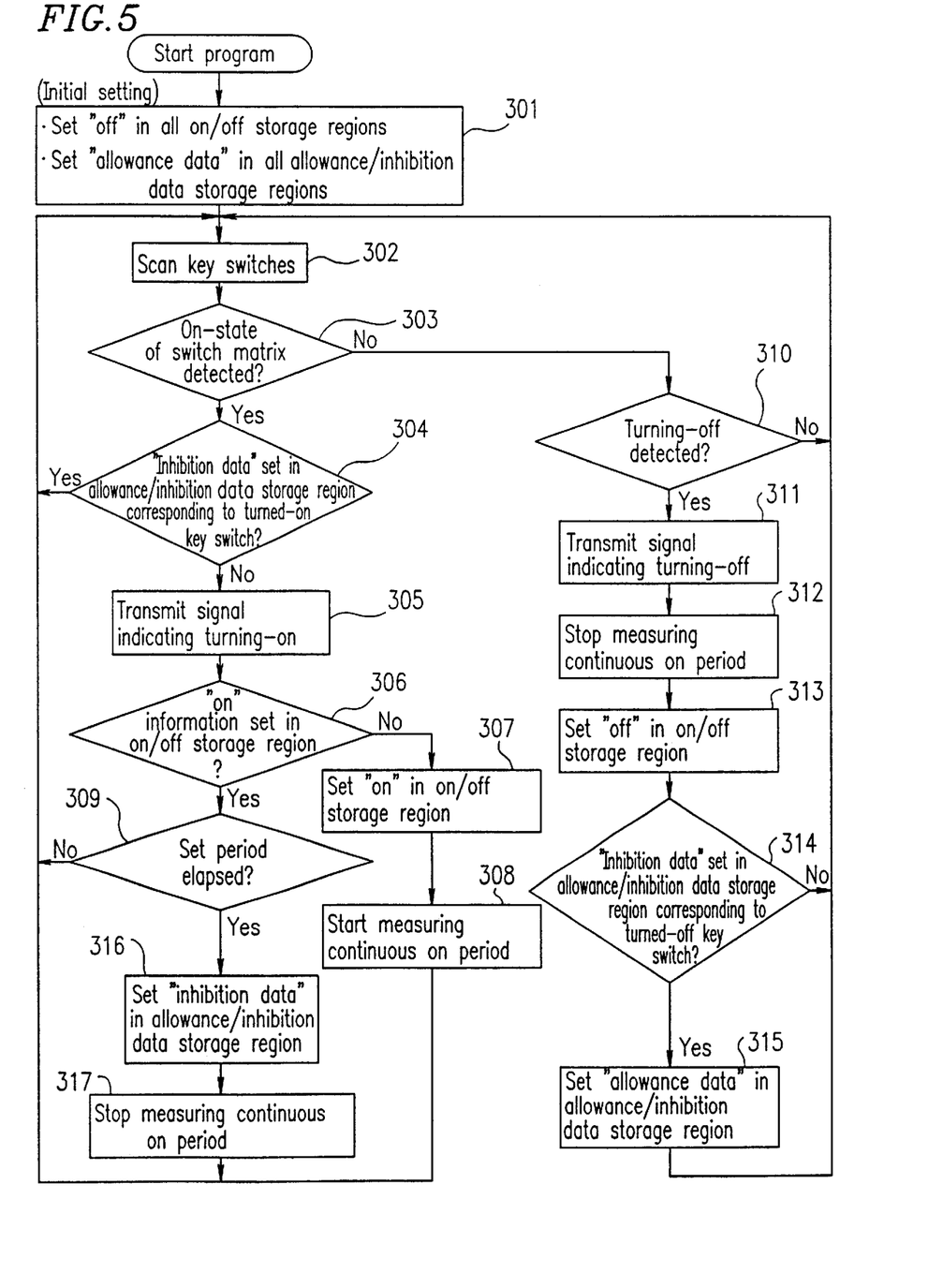
FIG. 5 is a flow chart illustrating a power saving function in the wireless input apparatus of the second example.

In the wireless input apparatus 10 having such a structure as described above, the following processing is performed according to the flow chart shown in FIG. 5.

First, the CPU 12 initializes the first time period storage region 32, the on/off storage table 33 and the key switch allowance/inhibition data storage table 34 included in the key state storage region 31 within the RAM 13. Then, the CPU 12 stores "0" in the first time period storage region 32, stores "off" in each of the storage regions S0 in the on/off storage table 33, and stores "allowance data" in each of the storage regions S1 in the key switch allowance/inhibition data storage table 34 (step 301).

Next, the CPU 12 sequentially scans the scanning lines 25-1 through 25-4 and detects turning-on of each of the key switches 27 based on a potential at the corresponding receiving lines 26-1 through 26-4 (steps 302 and 303). When one of the key switches 27 is turned on and the CPU 12 identifies the turned-on key switch 27 (Yes in step 303), the CPU 12 determines whether or not "allowance data" is stored in a storage region S1 in the key switch allowance/inhibition data storage table 34 which corresponds to the identified key switch 27 (step 304). If so (No in step 304), the CPU 12 transmits an identification signal indicating the turning-on of the identified key switch 27 from an infrared light emitting diode 28 (step 305). Then, the CPU 12 determines whether or not "on" is stored in a storage region S0 in the on/off storage table 33 which corresponds to the identified key switch 27 (step 306). When "off" rather than "on" is stored in the storage region S0 (No in step 306), the CPU 12 stores "on" in this storage region S0 (step 307), and writes time measured by the time measuring section 21 to the first time period storage region 32 in the RAM 13 to start measuring a continuous on period of the identified key switch 27 (step 308).

Thereafter, the CPU 12 sequentially scans the scanning lines 25-1 through 25-4, and detects turning-on of each of the key switches 27 based on a potential at the corresponding receiving lines 26-1 through 26-4 (steps 302 and 303). In the case where the identified key switch described above is still on (Yes in step 303), the CPU 12 verifies that "allowance data" is stored in the storage region S1 in the key switch allowance/inhibition data storage table 34 which corresponds to the identified key switch 27 (No in step 304). Then, the CPU 12 transmits an identification signal indicating turning-on of this key switch 27 (step 305), and verifies that "on" is stored in the storage region S0 in the on/off storage table 33 which corresponds to this key switch 27 (Yes in step 306). Thereafter, the CPU 12 obtains, as a continuous on period of the key switch 27, the difference between the time stored in the first time period storage region 32 and current time measured by the time measuring section 21, and compares the obtained continuous on period with a prescribed first time period to determine whether or not the continuous on period becomes equal to the first time period (step 309). If not (No in step 309), the program returns to the step 302.

If turning-on of the key switches 27 is not detected before the continuous on period becomes equal to the first time period (No in step 303), the CPU 12 determines whether or not the identified key switch 27 described above has been turned off (step 310). If so (Yes in step 310), the CPU 12 transmits an identification signal indicating the turning-off of this key switch 27 (step 311). Then, the CPU 12 initializes the time stored in the first time period storage region 32 to stop measuring the continuous on period of the key switch 27 (step 312). Thereafter, the CPU 12 changes "on" to "off" in the storage region S0 in the on/off storage table 33 which corresponds to the turned-off key switch 27 (step 313).

The CPU 12 also determines whether or not "inhibition data" is stored in the storage region S1 in the key switch allowance/inhibition data storage table 34 which corresponds to the turned-off key switch 27 (step 314).

In the foregoing processing, the content stored in the key switch allowance/inhibition data storage table 34 has not been changed. Therefore, "allowance data" is stored in every storage region S1 in the key switch allowance/inhibition data storage table 34. Accordingly, "allowance data" is stored also in the storage region S1 corresponding to the turned-off key switch 27 (No in step 314), whereby the program returns to the step 302.

In the case where "inhibition data" is stored in this storage region S1 (Yes in step 314), the CPU 12 changes "inhibition data" in the storage region S1 to "allowance data". Then, the program returns to the step 302.

Thus, each time any one of the key switches 27 in the switch matrix 24 is turned on and the CPU 12 identifies the turned-on key switch 27 (Yes in step 303), the CPU 12 first verifies that "allowance data" is stored in a storage region S1 in the key switch allowance/inhibition data storage table 34 which corresponds to the identified key switch 27 (No in step 304). Then, the CPU 12 transmits an identification signal indicating the turning-on of the identified key switch 27 from the infrared light emitting diode 28 (step 305). Thereafter, the CPU 12 stores "on" in a storage region S0 in the on/off storage table 33 which corresponds to the identified key switch 27 (step 307), and then starts measuring a continuous on period of the identified key switch 27 (step 308). In the case where this key switch 27 is turned off (Yes in step 310) before the continuous on period becomes equal to the first time period (No in step 309), the CPU 12 transmits an identification signal indicating the turning-off of the key switch 27 (step 311), and stops measuring the continuous on period of the key switch 27 (step 312). Then, the CPU 12 writes "off" to the storage region S0 in the on/off storage table which corresponds to the turned-off key switch 27 (step 313). Thereafter, the CPU 12 verifies that "allowance data" is stored in the storage region S1 in the key switch allowance/inhibition data storage table 34 which corresponds to that key switch 27 (No in step 314), and then the program returns to the step 302.

In the case where the on state of the identified key switch 27 continues (Yes in step 303), the processing in the steps 302 through 306 and 309 is repeated until the continuous on period becomes equal to the first time period (Yes in step 309). When the continuous on period becomes equal to the first time period, the CPU 12 changes "allowance data" in the storage region S1 in the key switch allowance/inhibition data storage table 34 which corresponds to this key switch 27 to "inhibition data" (step 316). Then, the CPU 12 initializes the time stored in the first time period storage region 32 to stop measuring the continuous on period (step 317). Thereafter, the program returns to the step 302.

Now, "inhibition data" is stored in the storage region S1 in the key switch allowance/inhibition data storage table 34 which corresponds to this key switch 27 (Yes in step 304). Therefore, even when the on state of this key switch 27 further continues (Yes in step 303), the program returns to the step 302 without transmission of the identification signal in step 305. In other words, until this key switch 27 is turned off, the CPU 12 only repeats the steps 302 and 303 and does not transmit the identification signal indicating turning-on of the key switch 27. As a result, in the microcomputer 11, power consumption by the infrared light emitting diode 28 is reduced.

In the case where no turning-on of the other key switches 27 is detected (No in step 303) and the identified key switch 27 is turned off (Yes in step 310), the CPU 12 transmits an identification signal indicating turning-off of the identified key switch 27 (step 311), and stops measuring the continuous on period of the identified key switch 27 (step 312). Then, the CPU 12 changes "on" in the storage region S0 in the on/off storage table 33 which corresponds to the identified key switch 27 to "off" (step 313). Thereafter, the CPU 12 verifies that "inhibition data" is stored in the storage region S1 in the key switch allowance/inhibition data storage table 34 which corresponds to the identified key switch 27 (Yes in step 314), and then the CPU 12 changes "inhibition data" in this storage region S1 to "allowance data" (step 315). Then, the program returns to the step 302.

As described above, when the identified key switch 27 is turned off, the CPU 12 stops measuring the continuous on period of the key switch 27, and writes "allowance data" to the storage region S1 in the key switch allowance/inhibition data storage table 34 which corresponds to this key switch 27. Therefore, in the case where the same key switch 27 is again turned on thereafter (Yes in step 303), the program goes to the step 305. This is because "allowance data" is stored in the storage region S1 in the key switch allowance/ inhibition data storage table 34 which corresponds to this key switch 27 (No in step 304). In step 305, the CPU 12 transmits an identification signal indicating turning-on of this key switch 27 and then carries out steps 306 through 308. Then, the program returns to the step 302.

As described above, in the second example, when any one of the key switches 27 in the switch matrix 24 is turned on, "on" is stored in the on/off storage table 33. In addition, when a continuous on period of this key switch 27 becomes equal to a prescribed first time period, "inhibition data" is stored in the key switch allowance/inhibition data storage table 34 and transmission of an identification signal indicating turning-on of this key switch 27 is stopped. Thus, power consumption by the infrared light emitting diode 28 is reduced.

Moreover, the storage regions S0 in the on/off storage table 33 and the storage regions S1 in the key switch allowance/inhibition data storage table 34 are formed corresponding to the respective key switches 27 in the switch matrix 24. Accordingly, a continuous on period of the key switch 27 can be measured key switch by key switch as well as transmission of an identification signal indicating turning-on of the key switch 27 can be stopped key switch by key switch. In this case, a continuous on period is not continuously measured but measured key switch by key switch. As a result, power consumption for measuring the continuous on period can be suppressed as much as possible.

EXAMPLE 3

A wireless input apparatus according to a third example of the present invention will now be described. The wireless input apparatus 10 of the third example is different from that of FIG. 1 in that the wireless input apparatus 10 of the third example includes a key state storage region 41 shown in FIG. 6 in a RAM 13 of a microcomputer 11 and performs the processing according to the flow chart shown in FIG. 7.

Figure 6:
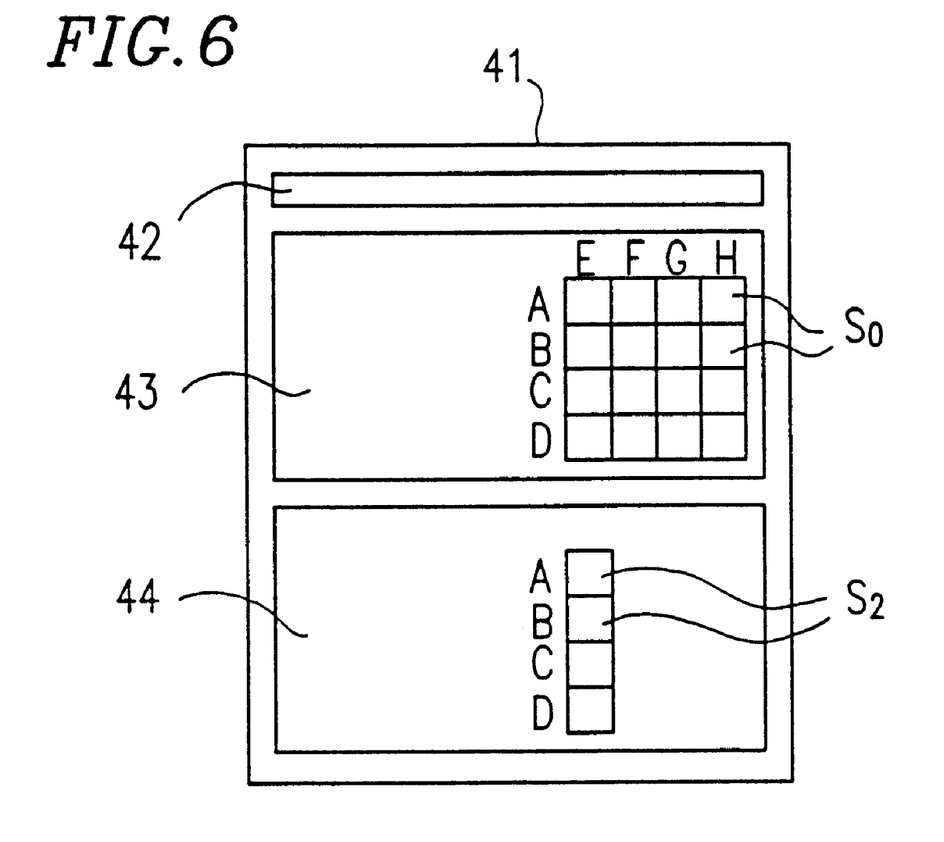
FIG. 6 is a diagram showing a structure of a key state storage region in a wireless input apparatus according to a third example of the present invention.

The key state storage region 41 shown in FIG. 6 includes a first time period storage region 42, an on/off storage table 43, and a scanning line allowance/inhibition data storage table 44.

As in the case of the first time period storage region 32 shown in FIG. 4, the first time period storage region 42 is provided to store time measured by a time measuring section 21 and obtain, as a continuous on period of a turned-on key switch 27, the difference between the time and current time measured by the time measurement section 21.

As in the case of the on/off storage table 33 shown in FIG. 4, the on/off storage table 43 has storage regions S0 corresponding to respective key switches 27 in a switch matrix 24, wherein "on" is stored in a storage region S0 corresponding to a key switch 27 which is on, whereas "off" is stored in a storage region S0 corresponding to a key switch which is off.

The scanning line allowance/inhibition data storage table 44 has storage regions S2 corresponding to respective scanning lines 25-1 through 25-4. When scanning of a scanning line is allowed, a CPU 12 stores "allowance data" in a storage region S2 corresponding to the allowed scanning line. When scanning of a scanning line is inhibited, the CPU 12 stores "inhibition data" in a storage region S2 corresponding to the inhibited scanning line.

Figure 7:
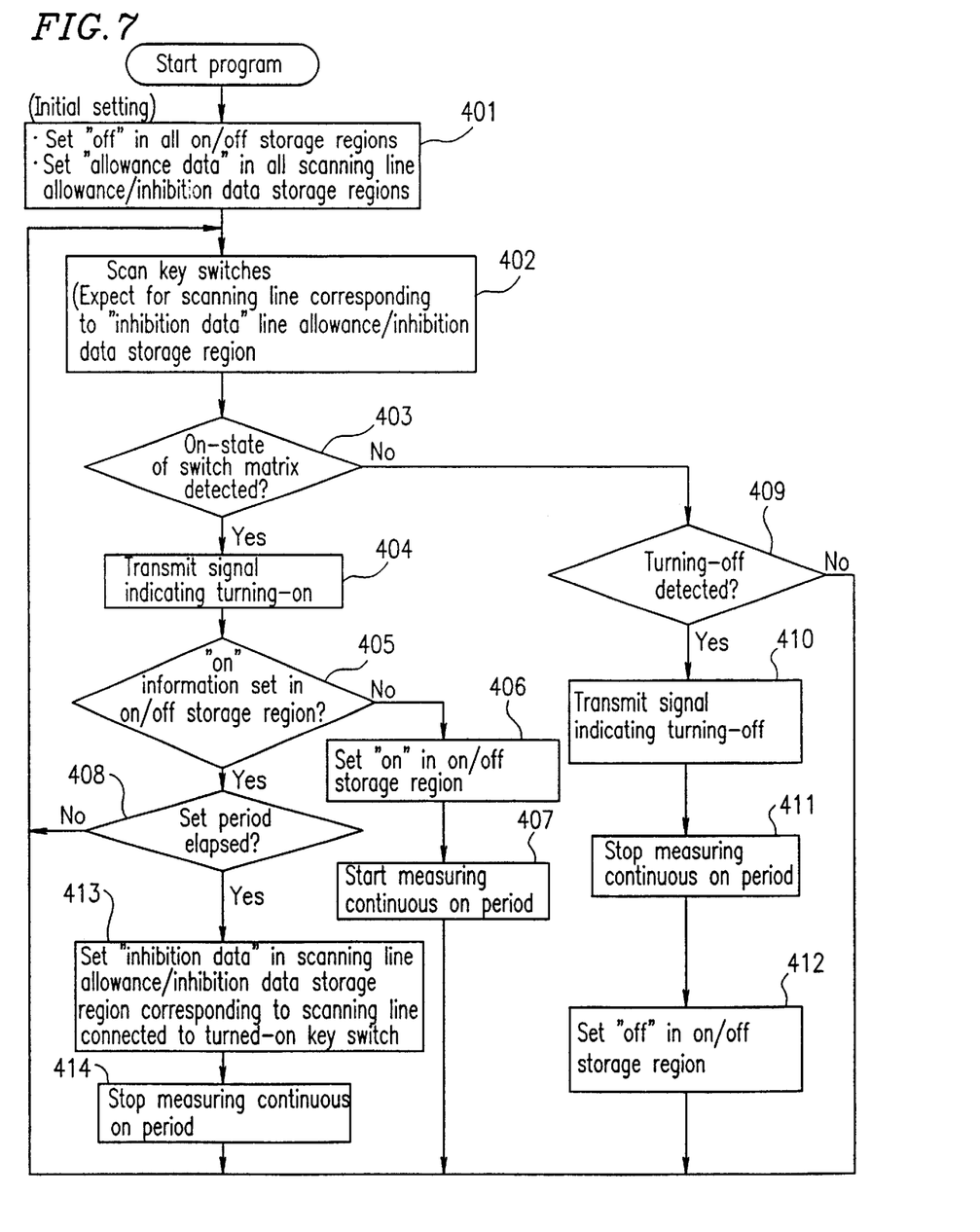
FIG. 7 is a flow chart illustrating a power saving function in the wireless input apparatus of the third example.

The wireless input apparatus 10 having such a structure as described above performs the following processing according to the flow chart shown in FIG. 7.

First, the CPU 12 initializes the first time period storage region 42, the on/off storage table 43 and the scanning line allowance/inhibition data storage table 44 in the key state storage region 41 within the RAM 13. Then, the CPU 12 stores "0" in the first time period storage region 42, stores "off" in each of the storage regions S0 in the on/off storage table 43, and also stores "allowance data" in each of the storage regions S2 in the scanning line allowance/inhibition data storage table 44 (step 401).

Right after this initialization, "allowance data" is stored in each of the storage regions S2 in the scanning line allowance/inhibition data storage table 44. Therefore, the CPU 12 sequentially scans the scanning lines 25-1 through 25-4 and detects turning-on of each of the key switches 27 based on a potential at corresponding receiving lines 26-1 through 26-4 (steps 402 and 403). When any one of the key switches 27 is turned on and the CPU 12 identifies the turned-on key switch 27 (Yes in step 403), the CPU 12 transmits an identification signal indicating the turning on of the identified key switch 27 from an infrared light emitting diode 28 (step 404). The CPU 12 then determines whether or not "on" is stored in a storage region S0 in the on/off storage table 43 which corresponds to the identified key switch 27 (step 405). If "off" rather than "on" is stored in the storage region S0 (No in step 405), the CPU 12 stores "on" in this storage region S0 (step 406), and writes time measured by the time measuring section 21 to the first time period storage region 42 to start measuring a continuous on period of the identified key switch 27 (step 407). Then, the program returns to the step 402.

Thereafter, the CPU 12 sequentially scans the scanning lines 25-1 through 25-4, and detects turning-on of each of the key switches 27 (steps 402 and 403). In the case where the identified key switch 27 described above is still on (Yes in step 403), the CPU 12 transmits an identification signal indicating turning-on of this key switch 27 (step 404). Then, the CPU 12 verifies that "on" is stored in the storage region S0 in the on/off storage table 43 which corresponds to this key switch 27 (Yes in step 405). Thereafter, the CPU 12 obtains the difference between the time stored in the first time period storage region 42 and current time measured by the time measuring section 21, and determines whether or not the difference (i.e., a continuous on period of the identified key switch 27) becomes equal to a prescribed first time period (step 408). If not (No in step 408), the program returns to the step 402.

If turning-on of the key switches 27 is not detected before the continuous on period becomes equal to the first time period (No in step 403), the CPU 12 determines whether or not the identified key switch 27 described above has been turned off (step 409). If so (Yes in step 409), the CPU 12 transmits an identification signal indicating the turning-off of this key switch 27 (step 410). Then, the CPU 12 initializes the time stored in the first time period storage region 42 to stop measuring the continuous on period (step 411). Thereafter, the CPU 12 changes the "on" in the storage region S0 in the on/off storage table 43 which corresponds to the turned-off key switch to "off" (step 412). Then, the program returns to the step 402.

Thus, each time any one of the key switches 27 in the switch matrix 24 is turned on (Yes in step 403), the CPU 12 transmits an identification signal indicating the turning-on of that key switch 27 (step 404). Thereafter, the CPU 12 stores "on" in a storage region S0 in the on/off storage table 43 which corresponds to that key switch 27 (step 406), and then starts measuring a continuous on period of the key switch 27 (step 407). In the case where the key switch 27 is turned off (Yes in step 409) before the continuous on period becomes equal to the first time period (No in step 408), the CPU 12 transmits an identification signal indicating the turning-off of that key switch 27 (step 410), and stops measuring the continuous on period (step 411). Then, the CPU 12 writes "off" to the storage region S0 in the on/off storage table 43 which corresponds to the turned-off key switch 27 (step 413). Then, the program returns to the step 402.

On the other hand, in the case where the on state of the identified key switch 27 described above continues (Yes in step 403), the processing in the steps 402 through 406 and 408 is repeated until the continuous on period of the identified key switch 27 becomes equal to the first time period (Yes in step 408). When the continuous on period becomes equal to the first time period, the CPU 12 changes the "allowance data" in a storage region S2 in the scanning line allowance/inhibition data storage table 44 which corresponds to a scanning line connected to this key switch 27 to "inhibition data" (step 413). Thereafter, the CPU 12 initializes the time stored in the first time period storage region 42 to stop measuring the constant on period of this key switch 27 (step 414). Then, the program returns to the step 402.

Now, "inhibition data" is stored in the storage region S2 in the scanning line allowance/inhibition data storage table 44 which corresponds to the scanning line connected to this key switch 27. Therefore, the CPU 12 scans each of the scanning lines except for that scanning line. For example, in the case where "inhibition data" is stored in a storage region S2 in the scanning line allowance/inhibition data storage table 44 which corresponds to the scanning line 25-1, the CPU 12 sets the scanning line 25-1 to high impedance and sequentially scans only the scanning lines 25-2 through 25-4 to render the scanning lines 25-2 through 25-4 at a low level. Accordingly, turning-on and turning-off of each of the key switches 27 connected to the scanning line 25-1 will not be detected.

Thus, once "inhibition data" is stored in a storage region S2 in the scanning line allowance/inhibition data storage table 44 which corresponds to any one of the scanning lines, steps 402 through 412 are repeated for all of the scanning lines except for that scanning line.

The above-described operation is performed for each of the scanning lines 25-1 through 25-4.

Note that once "inhibition data" is stored in a storage region S2 in the scanning line allowance/inhibition data storage table 44, the "inhibition data" can not be changed to "allowance data" until the microcomputer 11 is initialized to perform the processing shown on the flow chart of FIG. 7 from the beginning.

As described above, in the third example, when any one of the key switches 27 in the switch matrix 24 is turned on, "on" is stored in the on/off storage table 43. When a continuous on period of this key switch 27 becomes equal to the first time period, "inhibition data" is stored in the scanning line allowance/inhibition data storage table 44 to inhibit scanning of a scanning line corresponding to this key switch 27. As a result, transmission of an identification signal indicating the turning-on of this key switch 27 is stopped. Accordingly, power consumption by the infrared light emitting diode 28 is reduced. Moreover, since the inhibited scanning line will not be scanned, power consumption for scanning this scanning line can be eliminated.

EXAMPLE 4

A wireless input apparatus according to a fourth example of the present invention will now be described. The wireless input apparatus 10 of the fourth example is similar in structure to that of FIG. 1. The wireless input apparatus 10 of the fourth example is different from that of FIG. 1 in that the wireless input apparatus 10 of the fourth example includes a key state storage region 41 shown in FIG. 6 in a RAM 13 of a microcomputer 11 and performs the processing according to the flow chart shown in FIG. 8.

The key state storage region 41 shown in FIG. 6 includes a first time period storage region 42, an on/off storage table 43, and a scanning line allowance/inhibition data storage table 44.

Figure 8:
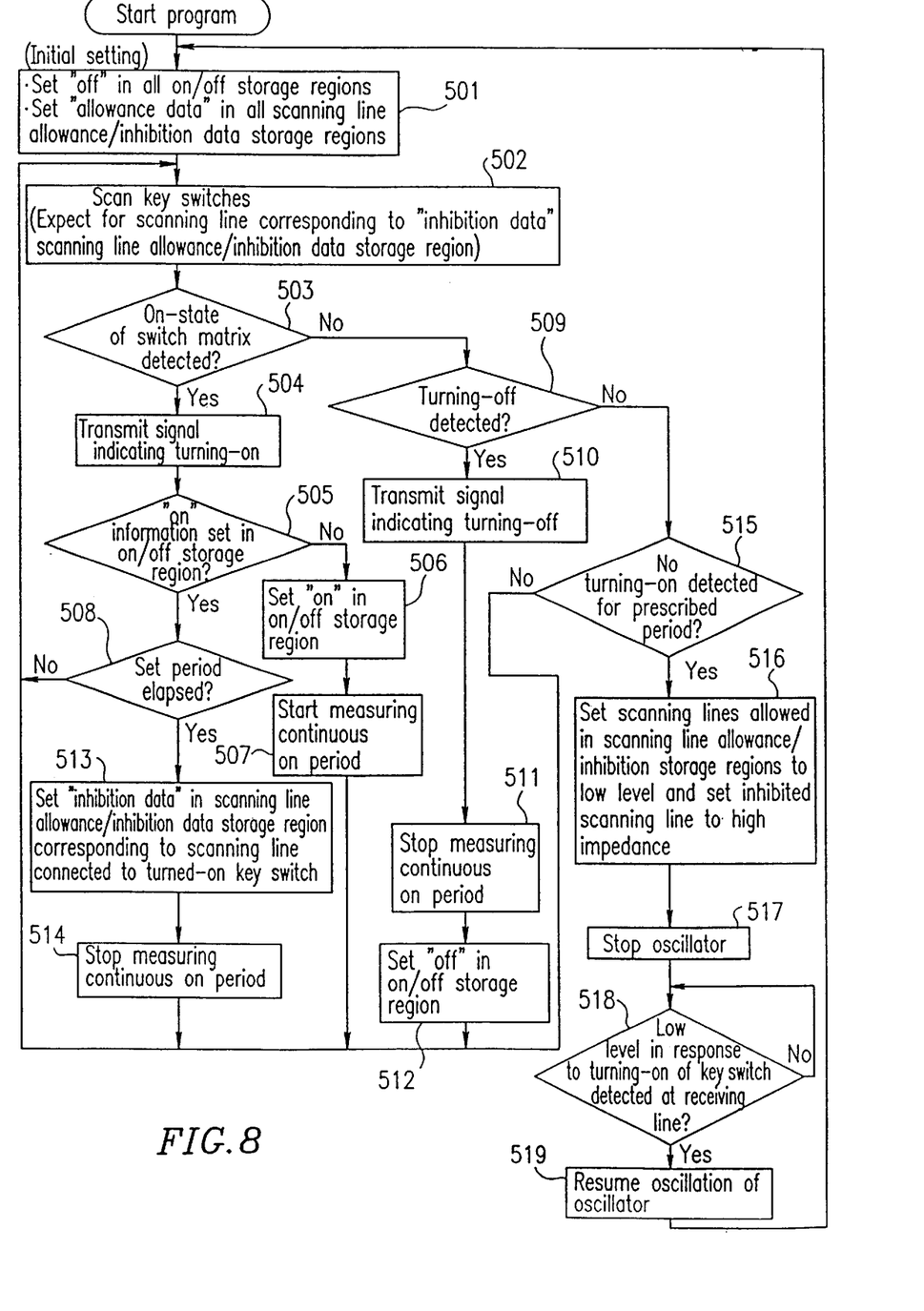
FIG. 8 is a flow chart illustrating a power saving function in a wireless input apparatus according to a fourth example of the present invention.

The wireless input apparatus 10 having such a structure performs the following processing according to the flow chart shown in FIG. 8.

First, a CPU 12 initializes the key state storage region 41. Then, the CPU 12 stores "0" in the first time period storage region 42, stores "off" in each of storage regions S0 in the on/off storage table 43, and also stores "allowance data" in each of storage regions S2 in the scanning line allowance/inhibition data storage table 44 (step 501).

Right after this initialization, "allowance data" is stored in each of the storage regions S2 in the scanning line allowance/inhibition data storage table 44. Therefore, the CPU 12 sequentially scans scanning lines 25-1 through 25-4 and detects turning-on of each of key switches 27 based on a potential at corresponding receiving lines 26-1 through 26-4 (steps 502 and 503). When any one of the key switches 27 is turned on and the CPU 12 identifies the turned-on key switch 27 (Yes in step 503), the CPU 12 transmits an identification signal indicating the turning-on of the identified key switch 27 from an infrared light emitting diode 28 (step 504). The CPU 12 then determines whether or not "on" is stored in a storage region S0 in the on/off storage table 43 which corresponds to the identified key switch 27 (step 505). If "off" rather than "on" is stored in the storage region S0 (No in step 505), the CPU 12 stores "on" in this storage region S0 (step 506), and writes time measured by a time measuring section 21 to the first time period storage region 42 to start measuring a continuous on period of the identified key switch 27 (step 507). Then, the program returns to the step 502.

Thereafter, the CPU 12 sequentially scans the scanning lines 25-1 through 25-4, and detects turning-on of each of the key switches 27 (steps 502 and 503). In the case where the identified key switch 27 described above is still on (Yes in step 503), the CPU 12 transmits an identification signal indicating the turning-on of the key switch 27 (step 504), and verifies that "on" is stored in a storage region S0 in the on/off storage table 43 which corresponds to this key switch 27 (Yes in step 505). Thereafter, the CPU 12 obtains the difference between the time stored in the first time period storage region 42 and current time measured by the time measuring section 21, and determines whether or not the difference (i.e., a continuous on period of the identified key switch 27) becomes equal to a prescribed first time period (step 508). If not (No in step 508), the program returns to the step 502.

If turning-on of the key switches 27 is not detected before the continuous on period becomes equal to the first time period (No in step 503), the CPU 12 determines whether or not the identified key switch 27 described above has been turned off (step 509). If so (Yes in step 509), the CPU 12 transmits an identification signal indicating the turning-off of this key switch 27 (step 510). Then, the CPU 12 initializes the time stored in the first time period storage region 42 to stop measuring the continuous on period of this key switch 27 (step 511). Thereafter, the CPU 12 changes the "on" in the storage region S0 in the on/off storage table 43 which corresponds to the turned-off key switch to "off" (step 512). Then, the program returns to the step 502.

On the other hand, in the case where the on state of the identified key switch 27 continues (Yes in step 503), the processing in the steps 502 through 505 and 508 is repeated until the continuous on period of the identified key switch 27 becomes equal to the first time period (Yes in step 508). When the continuous on period becomes equal to the first time period, the CPU 12 changes "allowance data" in the storage region S2 in the key switch allowance/inhibition data storage table 44 which corresponds to this key switch 27 to "inhibition data" (step 513). Thereafter, the CPU 12 stops measuring the continuous on period of this key switch 27 (step 514). Then, the program returns to the step 502.

Now, "inhibition data" is stored in the storage region S2 in the scanning line allowance/inhibition data storage table 44 which corresponds to a scanning line connected to this key switch 27. Therefore, the CPU 12 sets this scanning line to high impedance and scans each of the scanning lines except for this scanning line.

Thus, once "inhibition data" is stored in a storage region S2 in the scanning line allowance/inhibition data storage table 44 which corresponds to any one of the scanning lines, steps 502 through 512 are repeated for all of the scanning lines except for that scanning line.

Moreover, in the case where neither turning-on nor turning-off of the key switches 27 corresponding to each of the allowed scanning lines is detected upon scanning the allowed scanning lines (No in steps 503 and 509), that is, in the case where the keyboard is not operated, the CPU 12 starts measuring a continuous off period of the key switches 27, in a manner similar to the case of the continuous on time, using a prescribed storage region (not shown) in the RAM 13. Then, the CPU 12 determines whether or not the continuous off period becomes equal to a prescribed second time period (step 515). When the continuous off period has not become equal to the second period (No in step 515), the program returns to the step 502. In addition, when the continuous off period becomes equal to the second period (Yes in step 515), the CPU 12 retrieves each of the storage regions S2 in the scanning line allowance/inhibition data storage table 44 to find a storage region S2 which stores "inhibition data". Then, the CPU 12 sets all of the scanning lines except for the scanning line corresponding to the "inhibition data" storage region S2 to a low level (step 516). Thereafter, the CPU 12 blocks voltage supply to an oscillator 23 to stop the oscillator 23 (step 517). Thus, the operation of the microcomputer 11 is stopped. As a result, power consumption is reduced.

In this condition, a wake-up section 19 constituted by a logic circuit is in a stand-by state (No in step 518). When any one of the key switches 27 connected to the low level scanning lines is turned on (Yes in step 518), a receiving line connected to this turned-on key switch is rendered at a low level. Then, the potential at this receiving line is applied to the wake-up section 19 through a switch input port 17. The logic circuit in the wake-up section 19 responsively applies a signal to a clock generator 20, and the clock generator 20 in turn causes t he oscillator 23 to operate (step 519). Then, the clock generator 20 forms a clock signal from an oscillation signal from the oscillator 23 to supply the clock signal to the microcomputer 11. Thus, the microcomputer 11 starts operating again, and the program returns to the step 501.

It is assumed that any one of the key switches 27 connected to the inhibited scanning line , that is, the high-impedance scanning line is in an on state when the wake-up section 19 is in a stand-by state (No in step 518). In this case, since this inhibited scanning line is set to high impedance, a potential at the receiving lines connected to these key switches would not change. Accordingly, the wake-up section 19 would not activate the clock generator 20 in response to turning-on of each of the key switches 27 connected to the high-impedance scanning line.

As described above, in the fourth example, when any one of the key switches 27 in the switch matrix 24 is turned on, "on" is stored in the on/off storage table 43. When a continuous on period of this key switch 27 becomes equal to a prescribed first time period, "inhibition data" is stored in the scanning line allowance/inhibition data storage table 44 to inhibit scanning of a scanning line corresponding to this key switch 27. As a result, transmission of an identification signal indicating the turning-on of this key switch 27 is stopped. Accordingly, power consumption by the infrared light emitting diode 28 is reduced.

In the case where the CPU 12 scans the allowed scanning lines and does not detect turning-on of the key switches 27 connected to these scanning lines, the CPU 12 starts measuring a continuous off period of the key switches 27. When the continuous off period becomes equal to a second time period, the CPU 12 activates a key wake-up function. Then, only the allowed scanning lines are set to a low level, and the microcomputer 11 is stopped. Thus, the power saving state is attained. When any one of the key switches 27 connected to these low-level scanning lines is turned on, the operation of the microcomputer 11 is resumed by the wake-up function.

In other words, when any one of the key switches 27 is turned on and a continuous on period of the key switch 27 becomes equal to the first time period, scanning of a scanning line corresponding to this key switch 27 is inhibited. Moreover, when a continuous off period of the key switches 27 becomes equal to the second time period, the wake-up function is applied only to the key switches 27 corresponding to each of the allowed scanning lines. Accordingly, power can be saved effectively even when a part of the key switches 27 is left turned on. Furthermore, when the operation of the microcomputer 11 is resumed by the wake-up function, the key state storage region 41 is automatically initialized.

It should be noted that although an optical signal is transmitted from the wireless input apparatus in the above-described examples, a signal transmitted from the wireless input apparatus is not limited to the optical signal. The present invention can also be applied to a wireless input apparatus which transmits a radio wave signal or an ultrasonic signal.

As is apparent from the above description, according to the present invention, when a period during which a switch is left turned on, that is, a continuous on period of the switch becomes equal to a prescribed time period, transmission by a transmitting section is inhibited. Accordingly, power supply will not be wasted. For example, even when a switch is turned on by accident, the operation is stopped after a prescribed time period from the turning-on of the switch. Consequently, power consumption can be suppressed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A wireless input apparatus, comprising:

a plurality of switches;

a transmitting section for transmitting, in response to a turning-on of at least one switch of the plurality of switches, a prescribed signal corresponding to the turning-on of the at least one switch of the plurality of switches; and a transmission control section for measuring a time period during which an on state of the at least one switch continues and inhibiting the transmission of the prescribed signal corresponding to the turning-on of the at least one switch when the measured time period equals a first corresponding prescribed time period, wherein, when transmission of a first prescribed signal corresponding to a turning-on of a first switch of the plurality of switches is inhibited by the transmission control section, transmission of a second proscribed signal corresponding to a turning-on of a second switch of the plurality of switches is not inhibited, such that the transmitting section transmits the second prescribed signal in response to the turning-on of the second switch.

2. A wireless input apparatus according to claim 1, further comprising:

a storing section for storing inhibition data corresponding to the transmission of the prescribed signal corresponding to the turning-on of the at least one switch from the transmitting section when the measured time period is equal to the first corresponding prescribed time period.

3. A wireless input apparatus according to claim 2, further comprising means for scanning, switch by switch, the plurality of switches to determine a turning-on or a turning-off of each of the plurality of switches, wherein the transmitting section transmits a prescribed signal corresponding to a turned-on switch in response to every turning-on of a switch, the storing section stores, switch by switch, inhibition data corresponding to the transmission of the prescribed signal corresponding to the turned-on switch from the transmitting section when a measured time period is equal to a corresponding prescribed time period, and the transmission control section measures, switch by switch, the time period during which an on state of the turned-on switch continues, and inhibits, switch by switch, transmission from the transmission section when the inhibition data corresponding to the turned-on switch is stored in the storing section.

4. A wireless input apparatus according to claim 2, wherein the transmission control section:

measures a time period during which an off state of the at least one switch continues when the inhibition data corresponding to the at least one switch is not stored in the storing section;

inhibits transmission from the transmitting section when the measured time period becomes equal to a second corresponding prescribed time period; and resumes transmission of the prescribed signal corresponding to the turning-on of the at least one switch from the transmitting section in response to a subsequent turning-on of the at least one switch.

5. A wireless input apparatus according to claim 1, further comprising:

a storing section for storing invalidation data corresponding to the turning-on of the at least one switch when a measured time period is equal to a corresponding prescribed time period, wherein the transmission control section causes the turning-on of the at least one switch to be invalid when the invalidation data corresponding to the turning-on of the at least one switch is stored in the storing section.

6. A wireless input apparatus according to claim 5, further comprising means for scanning, switch by switch, the plurality of switches to determine a turning-on or a turning-off of each of the plurality of switches, wherein the transmitting section transmits a prescribed signal corresponding to a turned-on switch in response to every turning-on of a switch, the storing section stores, switch by switch, invalidation data corresponding to the turned-on switch when a measured time period is equal to a corresponding prescribed time period, and the transmission control section measures, switch by switch, the time period during which an on state of the turned-on switch continues, and causes, switch by switch, the turning-on of the turned-on switch to be invalid when the invalidation data corresponding to the turned-on switch is stored in the storing section.

7. A wireless input apparatus according to claim 5, wherein the transmission control section:

measures a time period during which an off state of the at least one switch continues when the invalidation data corresponding to the turning-on of the at least one switch is not stored in the storing section;

inhibits transmission from the transmitting section when the measured time period becomes equal to a second corresponding prescribed time period; and resumes transmission of the prescribed signal corresponding to the turning-on of the at least one switch from the transmitting section in response to a subsequent turning-on of the at least one switch.

* * * * *